3,477,910
METHOD OF PRODUCTION OF UROKINASE
Nathan H. Sloane, Germantown, Tenn., assignor to Century Laboratories, Inc., a corporation of Delaware
No Drawing. Filed Oct. 17, 1966, Ser. No. 586,968
Int. Cl. C07g 7/02, 7/026
U.S. Cl. 195—66                                6 Claims

ABSTRACT OF THE DISCLOSURE

A method for the production of urokinase is disclosed which comprises admixing tannic acid with mammalian urine which results in the precipitation therefrom of a urokinase-containing precipitate which is collected, solubilized by the addition thereto of an alkali solution and purified.

---

This invention relates to a method for extracting crude urokinase from urine, and, more particularly to a method wherein tannic acid is added to urine in order to precipitate the urokinase-containing proteins therefrom. This crude urokinase precipitate, after being separated from the urine, by means of centrifuging, decanting, etc., is solubilized by dispersing it in a buffer solution, to which is added a highly alkaline solution. The tannic acid and other impurities are then eliminated from the solubilized crude urokinase by dialysis.

Urokinase is a substance in mammalian urine and is of importance in the treatment of certain blood disorders, such as those which tend to cause the formation of blood clots in the cardiovascular system. It is essential that persons afflicted with such disorders be treated for this condition before thrombosis occurs, and such treatment frequently involves the administration of urokinase to dissolve the blood clots and prevent the further formation thereof.

It is known that urokinase is an enzyme cofactor which stimulates the production of the clot-dissolving proteolytic enzyme, plasmin, in the blood. Bacterial filtrates, such as staphylokinase and streptokinase, also have the ability to promote the formation of plasmin. However, the great quantities of urine which are available as a source of urokinase make a method which utilizes this source economically desirable. The large volume of urine required to obtain sufficient amounts of urokinase, however, make it desirable that a method be devised wherein a urokinase-rich fraction of comparatively small unit volume can be quickly and efficiently isolated from the urine.

Heretofore, urokinase has been obtained from urine by the adsorption thereof on benzoic acid as disclosed in U.S. Patent No. 2,989,440, patented June 20, 1961. Benzoic acid does not combine chemically with the urokinase but instead the urokinase is adsorbed on the benzoic acid and, as a result, this necessitates a number of cumbersome and inefficient steps for the purification thereof. The process disclosed in the foregoing patent is, therefore, not entirely satisfactory.

It is known that tannic acid will precipitate protein from solutions. However, tannic acid is well known to be a denaturing agent which destroys enzymes. Therefore, tannic acid would not be expected to find use in a process for the production of the enzyme, urokinase. For example, U.S. Patent No. 2,292,841, patented Aug. 11, 1942, discloses the precipitation of protein from urine by tannic acid. However, no attempt is made to recover urokinase in the process of this patent, and, in fact, the urokinase-containing precipitated protein, being insoluble in water under the conditions described therein, would be discarded by that procedure.

It has now been found that by using tannic acid as a urine precipitant, one can utilize large quantities of urine and, in one step, efficiently precipitate the urokinase therefrom. This effectively reduces, immediately in the process, the great bulk of material to be handled in further isolating the pure urokinase. In effect, it provides a crude urokinase-containing protein precipitate which is rich in urokinase and comparatively small in unit volume. The efficinecy provided thereby is an economically important factor in the manufacture of urokinase.

Broadly stated, this invention comprises the addition of a tannic acid solution to urine to precipitate therefrom a urokinase-containing protein fraction. This precipitate is separated from the urine by any suitable means such as centrifuging, decanting, filtering, etc., the urine solution remaining being discarded. The crude urokinase precipitate is then suspended in a buffer solution to which is then added a highly alkaline solution. Upon the addition of the alkali, the precipitate is dissolved. The solubilized protein precipitate is then dialyzed to eliminate tannic acid and any other impurities which may be present. The solution remaining in the dialysis sack after dialysis is the crude urokinase solution which may then be further treated by methods well known in the art to obtain pure urokinase.

The foregoing novel process results in the formation of a chemical combination between the tannic acid and the urokinase, thus facilitating the separation and subsequent purification of the urokinase. When the tannic acid-urokinase precipitate is dissolved by the addition of an alkaline solution, the tannic acid can then be readily removed, together with other impurities, by means of dialysis.

The urine which is to be processed by the method described herein is collected in the presence of a preservative, such as chloroform, to prevent the growth of bacteria which could cause a harmful reaction in a patient receiving urokinase manufactured therefrom. Advantageously, tannic acid is added to the urine in amounts necessary only for the precipitation of the urokinase-containing fraction therefrom. The precipitate which is formed upon the addition of tannic acid is easily separated from the urine by any suitable means such as centrifugation or filtration. The precipitate itself, which is a crude protein mixture including a tannic acid-urokinase compound, is, after separation and collection, suspended in an aqueous buffer solution, as for example tris (hydroxymethyl) aminomethane buffer. To the aqueous buffer suspension of the precipitate is added, drop-wise, an alkali solution, for the purpose of dissolving the precipitate. Sodium hydroxide has been found to be quite effective for this purpose, but it is contemplated that any common alkali solution will be effective, provided the pH of the solution is not allowed to go above about pH10. The solubilizing step is carried out at low temperature, as for example at ice bath temperature, to prevent the destruction of the heat labile urokinase. The solubilized crude urokinase is then dialyzed to remove the tannic acid and any salts that may have formed in the precipitation process. The crude urokinase dialysate may then be treated in a manner known in the art to further purify and separate the urokinase.

Although only human urine has been treated by the method described herein because of the problem of antigenicity which is involved, this invention contemplates the treatment of all types of mammalian urine to produce urokinase.

EXAMPLE

To one liter of human urine, which is collected in the presence of chloroform, is added 10 ml. of a tannic acid solution. This tannic acid solution is produced by adding 1 g. of solid tannic acid and 0.5 ml. of acetic acid to 100 ml. of 50% ethyl alcohol. The precipitate that is formed upon the addition of tannic acid solution is collected by centrifugation (approximately 50 mg. of precipitated protein). The precipitated protein is suspended in 20 ml. of a buffer solution (0.05 M tris-HCl at pH 7.4). This material is then brought into solution by the drop-wise addition 8.6 ml. of 0.2 M sodium hydroxide at 0° C. The soluble solution is then dialyzed against the tris-HCl buffer. The solution remaining in the dialysis sack is soluble crude urokinase representing approximately 10,000 CTA units (200 CTA per mg. of protein).

I claim:
1. A method for the production of crude urokinase from mammalian urine which comprises:
   adding tannic acid to the urine to precipitate urokinase-containing protein therefrom,
   separating the crude urokinase precipitate from the urine,
   suspending said precipitate in a buffer solution,
   solubilizing said crude urokinase precipitate by adding an alkali solution to said buffer suspension thereof, and
   removing impurities from the solubilized crude urokinase.

2. The process according to claim 1 in which the pH of the crude urokinase buffer suspension is maintained at a level not greater than 10 during the solubilization thereof.

3. The process according to claim 1 in which the impurities are separated from the solubilized crude urokinase by dialysis.

4. The process according to claim 2 in which the crude urokinase precipitate is solubilized by the addition of sodium hydroxide to said urokinase buffer suspension.

5. The process according to claim 2 in which said urine is human urine.

6. A method for the production of crude urokinase from human urine which comprises:
   adding tannic acid to the urine in an amount sufficient to precipitate the urokinase-containing protein therefrom,
   separating the crude urokinase precipitate from the urine,
   suspending said precipitate in a buffer solution,
   solubilizing said crude urokinase precipitate by adding an aqueous solution of sodium hydroxide to said buffer suspension thereof and maintaining said buffer suspension at a pH of 10 or less during the solubilization thereof, and
   removing impurities from the solubilized crude urokinase by dialysis.

References Cited
UNITED STATES PATENTS

| | | | |
|---|---|---|---|
| 3,081,236 | 3/1963 | Doczi | 195—66 |
| 3,355,361 | 11/1967 | Lesuk | 195—62 |

LIONEL M. SHAPIRO, Primary Examiner

PO-1050
(5/69)

UNITED STATES PATENT OFFICE
CERTIFICATE OF CORRECTION

Patent No. 3,477,910    Dated November 11, 1969

Inventor(s) Nathan H. Sloane

It is certified that error appears in the above-identified patent and that said Letters Patent are hereby corrected as shown below:

| COLUMN | LINE | READS | SHOULD READ |
|---|---|---|---|
| 1 | 29 | substance in | substance found in |

SIGNED AND
SEALED
FEB 17 1970

(SEAL)
Attest:

Edward M. Fletcher, Jr.
Attesting Officer

WILLIAM E. SCHUYLER, JR.
Commissioner of Patents